Patented Mar. 7, 1933

1,900,663

UNITED STATES PATENT OFFICE

HERMANN PLAUSON, OF DARMSTADT, GERMANY, ASSIGNOR, BY MESNE ASSIGNMENTS, TO RADIOCHEMISCHES FORSCHUNGS-INSTITUT, G. M. B. H., OF DARMSTADT, GERMANY, A LIMITED COMPANY OF GERMANY

MANUFACTURE OF CAOUTCHOUC LACQUERS OR VARNISHES

No Drawing. Application filed June 16, 1930, Serial No. 461,649, and in Germany January 20, 1930.

My invention relates to the production of lacquers or varnishes, and the object of the present invention is to produce a new caoutchouc lacquer or varnish, which, as compared with similar products, has the great advantage of being practically odorless enabling it to be employed as a first-class varnish for pigments or as binding medium.

The invention consists in the discovery that for the vulcanization for the purpose of producing liquid caoutchouc lacquers instead of sulfur, suitable nitro-compounds may be used, e. g. symmetric trinitro-benzol, various trinitro-phenols, etc.—well known vulcanization accelerators can also be added.

The advantage of the manufacture of caoutchouc lacquers according to the present invention consists in this that caoutchouc lacquers of a higher concentration can be produced, which, as compared with the rubber varnishes vulcanized with sulfur as practised at present, have an agreeable odor. As dispersion media, both saturated as well as unsaturated hydrocarbons, further terpenes, and preferably mixtures of various hydrocarbons can be used. Especially good lacquers and varnishes are obtained, if polymerizable or polmerized vinyl- or acrylic acid ester compounds, or similar substances are added to the caoutchouc, because thereby aging phenomena are prevented, while quality, hardness and solidity are varied or improved at will.

Moreover, I have found that caoutchouc lacquers can be produced not only by the heating of raw caoutchouc with the above mentioned vulcanizing agents and additional substances under pressure in the presence of much liquid, but that rubber-like varnishes can also be obtained, if the solid mass of caoutchouc vulcanized in a similar manner with nitro compounds is subjected to pressure and heat in suitable dispersion media of hydrocarbons etc., and in this way is liquefied.

A colloidal dispersion can also be obtained, if the solid caoutchouc which has previously been vulcaniz·d with nitro-compounds is subjected to a treatment in a colloid mill below the boiling temperature of the dispersion medium.

I have also found that by the addition of oxidizing means, e. g. nitrogen oxides, peroxides, superoxides of inorganic as well as organic nature, or metal oxides, the vulcanization can be considerably facilitated and the vulcanized rubber dispersion obtained is improved.

The following examples will more clearly illustrate the new process.

Example 1

100 parts of caoutchouc are dissolved in 900 parts of benzine and ½ to 1% of symmetric trinitro-phenol is added. Thereupon, the mixture is carefully heated in an autoclave to 125° C. for 1 to 2 hours and then for ¼ to ½ hour to 150° to 180° C. After filtration a liquid varnish-like mass is obtained which can be very easily brushed on and can be used as a first-class binding agent for pigments and lacquers. From 5% to 20% of vulcanized caoutchouc can be added in the shape of lacquer or varnish to any desired filling materials for the purpose of producing plastic masses. By the addition of ½% to 1% of a super-oxide, e. g. sodium-super-oxide, the period of vulcanization and the temperature can be decreased. If it is desired to obtain a harder product, polymerizable or polymerized vinyl compounds, e. g. vinyl acetate, chlorine- or bromine-vinyl compounds are added and together with the caoutchouc are subjected to vulcanization. The amount of these additions depends on the desired solidity and hardness.

Example 2

100 parts of caoutchouc with the addition of 10% to 30% lead oxide, or other well-known fillers or pigments are mixed with 0.5 to 3 parts of symmetric trinitro-phenol and 1 to 3 parts of magnesium super-oxide, or 0.5% to 1% of an organic super-oxide, e. g. benzol super-oxide, then are kneaded together and by well-known methods are vulcanized under pressure. A vulcanized product produced without sulfur as vulcanizing agent is obtained.—10 to 20 parts of this rubber together with 80 to 90 parts of benzine, or mixtures of benzine and temperature and/or acid esters, e. g. acetic acid ester, propyl ester or butyl ester, are subjected to pressure as in the Example 1 while continually stirred. The result, as in the Example 1, is a practically odorless rubber varnish, which according to demand can be used directly, or after the evaporation of a portion of the solution, as varnish or an adhesive for plastic substances.

*Example 3*

Of the vulcanization product obtained by the process of the Example 2 and previously comminuted or steeped, 10 to 20 parts by weight, together with 90 to 100 parts of turpentine, or other hydrocarbons of a high boiling point, are treated in a beetling mill below the boiling temperature of the dispersion medium, until a colloidal dispersion is obtained. It was a surprising fact, that also from the vulcanized product produced with nitro compounds and oxygen colloidal dispersions could be obtained in colloid mills, or similarly operating apparatus, for it is well known that caoutchouc which has become hardened by the action of the sun and air can no longer be dispersed.

*Example 4*

80 parts of caoutchouc and 20 parts of solvent naphtha together with 900 parts of benzol, toluol, or other suitable aromatic hydrocarbons, are heated as described in the Example 1 in the presence of 1% to 3% of an inorganic or organic hyper-oxide and nitro-compounds. A varnish is formed which during the operating process contains cumaron resin forming from the solvent naphtha, which resin can be homogeneously dispersed and distributed with colloidal caoutchouc.

To unite caoutchouc with solvent naphtha to form a cumaron-resin-caoutchouc mixture and to convert the same into a colloidal solution as varnish is novel.

*Example 5*

60 parts of caoutchouc and 40 parts of vinyl acetate in the presence of nitro-compounds and 1% to 3% acetic acid or phthalic acid anhydrid are heated as in the Example 1 together with 800 to 900 parts of benzine, benzol or carbon tetrachloride. A clear yellowish varnish solution is obtained, which when dried results in a hard film and can be used as a lacquer varnish or adhesive for plastic masses.

In a similar manner, also other substances which when polymerized become solid can be used as an adhesive to caoutchouc varnish.

The proportion can be varied at will, depending upon the hardness and adhesive strength of the varnishes to be obtained. Substances, which are known as accelerators during the vulcanization with sulphur, can be added and in many cases can be recommended.

The term "caoutchouc" used in the appended claims shall include also caoutchouc- or rubber-like substances, e. g. gutta percha, balata etc.

I claim:

1. The process of producing rubber lacquers and varnishes, comprising heating rubber in the presence of tri-nitro phenol together with a volatile hydrocarbon thereby causing the dispersion of the liquefied vulcanized rubber.

2. The process of producing rubber lacquers and varnishes, comprising heating rubber and a vinyl compound in the presence of tri-nitro phenol together with a volatile hydrocarbon thereby causing the dispersion of the liquefied vulcanized rubber.

3. The process of producing rubber lacquers and varnishes, comprising heating rubber, a vinyl compound and acetic acid in the presence of tri-nitro-phenol together with a volatile hydrocarbon thereby causing the dispersion of the liquefied vulcanized rubber.

4. The process of producing rubber lacquers and varnishes, comprising heating rubber and vinyl acetate in the presence of tri-nitro phenol together with a volatile hydrocarbon thereby causing the dispersion of the liquefied vulcanized rubber.

In testimony whereof I affix my signature.

HERMANN PLAUSON.